United States Patent
Frank

(10) Patent No.: US 6,443,406 B1
(45) Date of Patent: Sep. 3, 2002

(54) MEANS OF MOUNTING AND ADJUSTING TELESCOPIC METAL TUBES

(75) Inventor: John Frank, Odense (DK)

(73) Assignee: Kompan A/S, Ringe (DK)

( * ) Notice: Subject to any disclaimer, the term of this patent is extended or adjusted under 35 U.S.C. 154(b) by 0 days.

(21) Appl. No.: 09/788,079

(22) Filed: Feb. 16, 2001

(51) Int. Cl.$^7$ .................................................. A47F 5/00
(52) U.S. Cl. ...................................... 248/125.8; 403/378
(58) Field of Search .............................. 248/125.8, 161, 248/157, 188.5; 403/378, 374.2, 374.3, 294, 350, 347

(56) References Cited

U.S. PATENT DOCUMENTS

| | | | |
|---|---|---|---|
| 5,385,323 A | * | 1/1995 | Garelick ...................... 248/161 |
| 6,095,950 A | | 8/2000 | Katz ............................ 482/35 |
| 6,189,843 B1 | * | 2/2001 | Pfister ......................... 248/161 |

* cited by examiner

Primary Examiner—Ramon O. Ramirez
(74) Attorney, Agent, or Firm—William J. Sapone; Coleman Sudol Sapone, P.C.

(57) ABSTRACT

In order to make it easier to mount for instance playground equipment comprising a tube construction which is anchored to a base the subject invention offers a simplification by incorporating a means to facilitate the longitudinal adjustment of the grooves in relation to the base. This means comprises a tube piece (2) extending in the tube (1), which tube piece is anchored to the base and which is configured with longitudinal folds for the formation of outwardly open channels (4). In these channels (4) a wedge element (3) is inserted which by means of bolts (6) through the tube (1) can tighten the wedge and due to the cross sectional shape of the grooves cause the tube piece (2) to expand so that it squeezes against the inside of the tube (1). In this manner the tube (1) can be adjusted in the longitudinal direction in connection with both the mounting and the subsequent adjustment.

5 Claims, 3 Drawing Sheets

Figure 1:
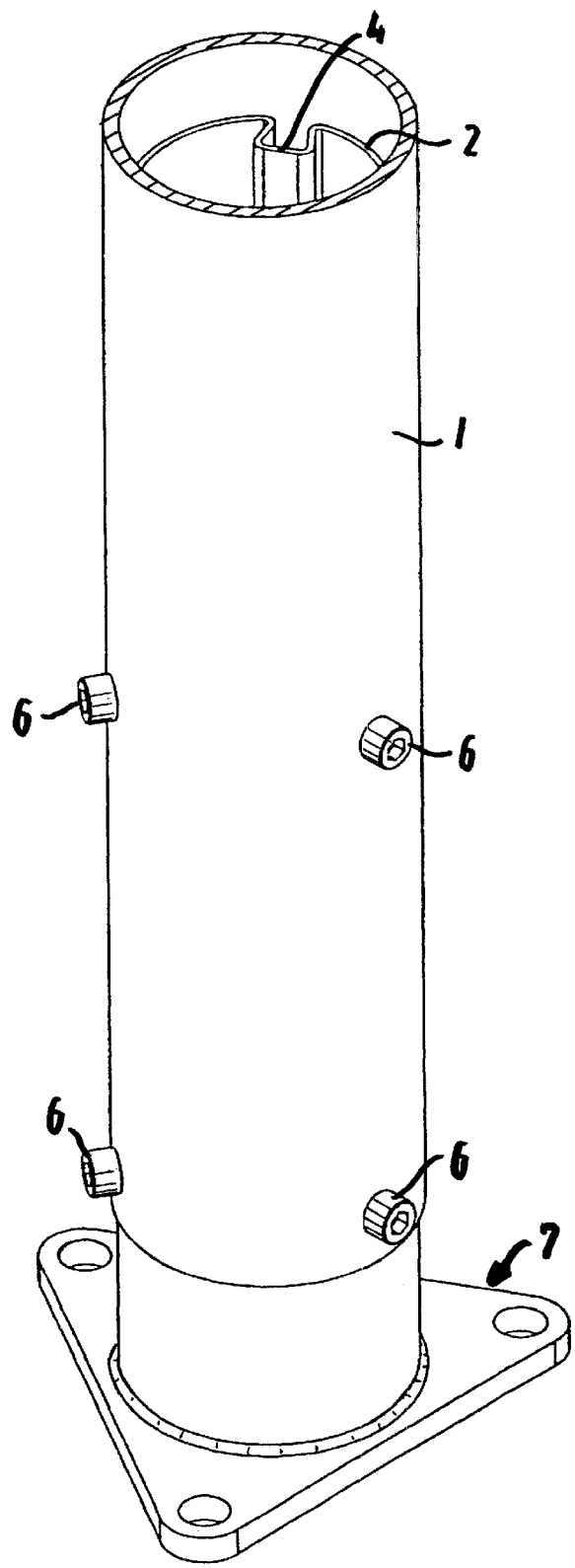

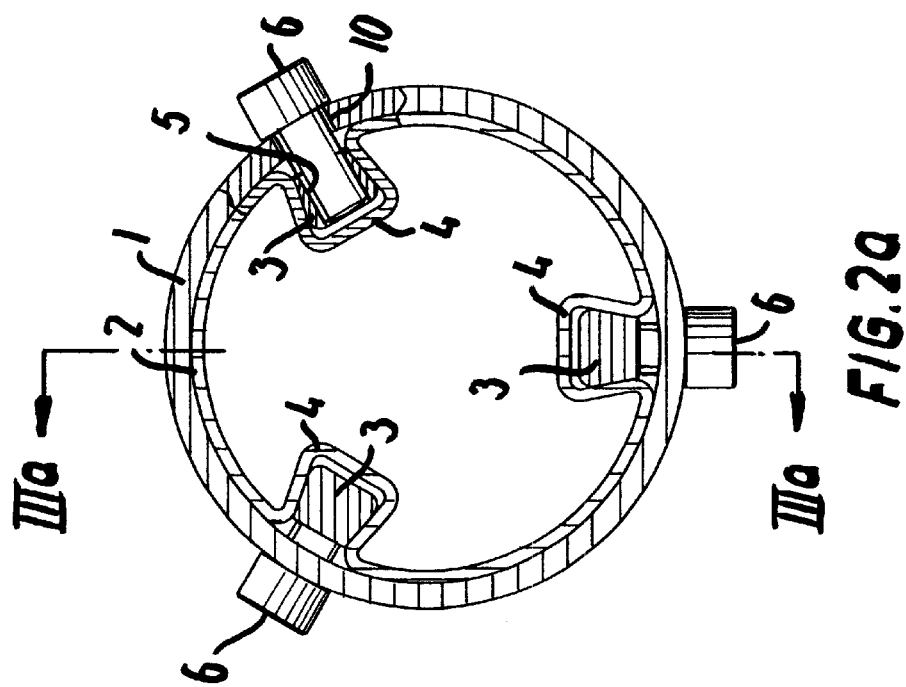
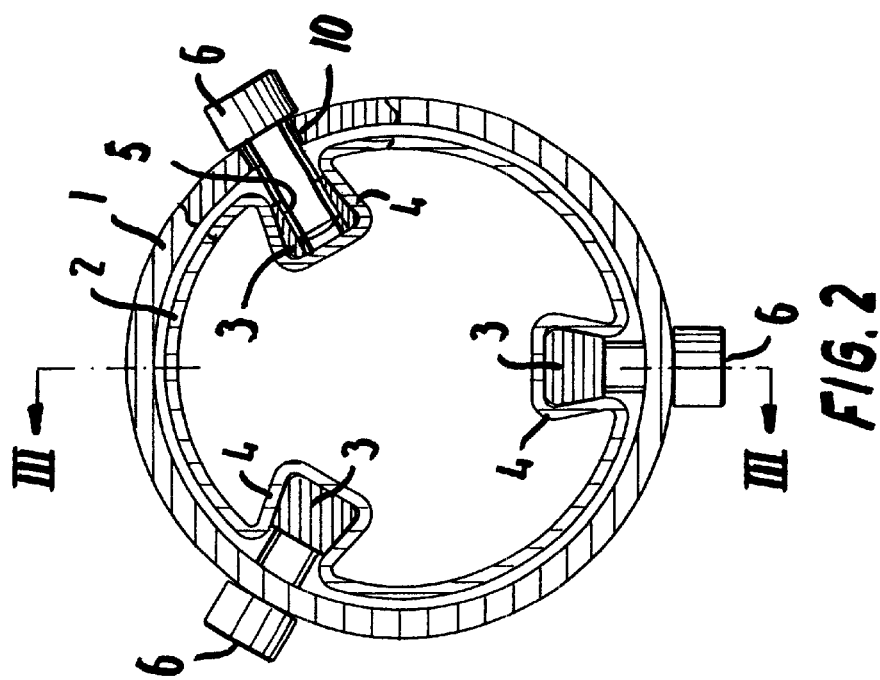

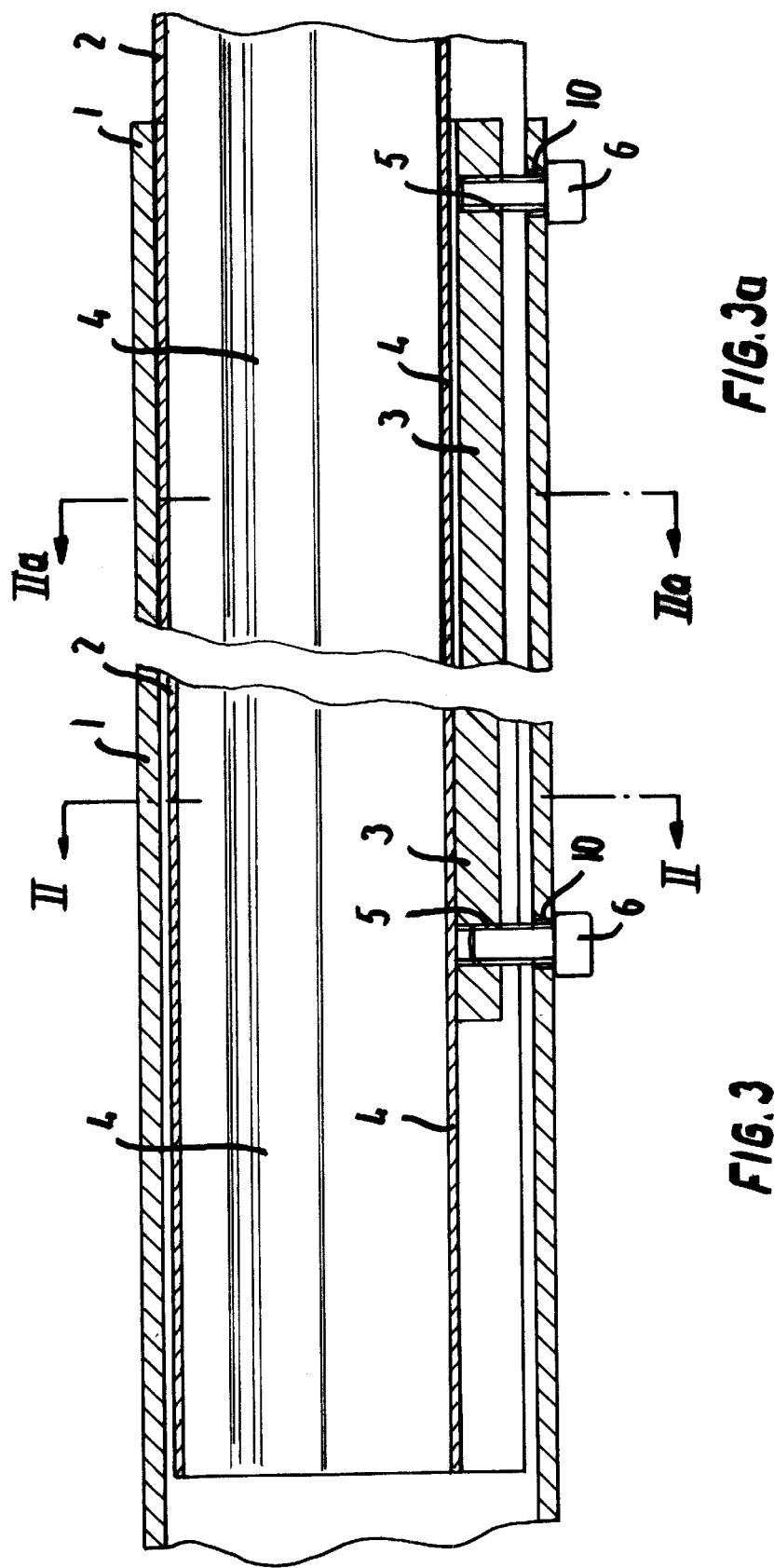

MEANS OF MOUNTING AND ADJUSTING TELESCOPIC METAL TUBES

THE KNOWN PRIOR ART

The invention relates to a means of mounting and adjusting two tubes which can slide inside one another.

When constructing playground equipment comprising a frame of metal rods or tubes, each metal tube is normally secured to a base in order to provide a stable and safe item of playground equipment.

U.S. Pat. No. 6,095,950 discloses an example of such an item of equipment comprising three posts which at their bottom are provided with feet being secured to the base.

This construction does not permit immediate adjusting or setting and therefore requires a carefully erected base. Add to this that problems may occur in the event that the foundation subsides or the posts deform which will require the adjusting of one or more of the posts at the base. Any such adjustment will have to be performed by adjusting the actual attachment to the base.

OBJECT OF THE INVENTION

It is the object of the invention to facilitate the installation of the playground equipment as well as the adjustment of the supporting metal tubes, and this is obtained according to the invention when the interior of the tubes is provided with inwardly projecting grooves in which a wedge is fitted having a cross sectional shape which causes the diameter of the interior tube to expand once the wedge is tightened outwards towards the outer tube for assembly of the tubes.

By configuring the interior tube so that it is an expansion body, it becomes possible in this simple manner to tighten this body from without in order to secure the outer tube in a manner which permits adjustment even after instalment of the playground equipment.

This permits expansion to be obtained from without by means of bolts or the like so as to obtain a relative displacement of the telescopic tubes in relation to each other.

Since each groove in the interior tube is configured in the tube wall by some kind of folding, the tube will form an expansion body which will expand upon tightening of the wedges, and contract and thus end the expansion force upon disengagement of the wedges.

As disclosed in claim 2, by configuring the grooves and the wedges with a shape on the sides which slopes towards the outside of the tubes, an evenly distributed expansion of the interior tube against the outer tube is ensured.

As disclosed in claim 3, by configuring several grooves along the tube, such as three grooves at equal distances to each other, a very uniform compression and thus assembly of the tubes is obtained.

As disclosed in claim 4, by providing the wedge body with one or more thread holes extending from without and inwards, and by also providing holes through the outer tube, an outwardly directed tigthening of the wedges is easily and safely obtained by means of bolts through the holes.

Finally, as disclosed in claim 5, it is expedient to provide the interior tube with a base plate at the end, whereby the adjustable assembly can be established at the lower part of the tube where it causes no inconvenience to the user of the playground equipment.

THE DRAWING

An example of an embodiment of the means according to the invention will be disclosed in the following section with reference to the drawing, in which FIG. 1 shows the lower portion of a column with base plate, FIG. 2 is a cross sectional view of the tube in its non-tightened position in the direction II—II in FIG. 3, FIG. 2a shows the same cross section in the tightened position seen in the section IIa—IIa in FIG. 3

FIG. 3 is a longitudinal view through the tube seen in the direction III—III in FIG. 2, and FIG. 3a shows the same section with the tube in its tightened position seen in the direction IIIa—IIIa in FIG. 2a.

DESCRIPTION OF AN EXAMPLE EMBODIMENT

The invention will be described in closer detail as a column or a supporting tube, for instance by way of a tube in an article of playground equipment.

One or more such tubes constitute the bearing structure to which various playground accessories are secured, such as climbing ropes, slides, ladders, and the like.

Such an item of playground equipment must be firmly secured to its base in order that it will tolerate the often great forces to which it is subjected during use.

One or more of the tubes may be constructed in accordance with the invention and as shown in FIG. 1, which shows the lower part of a tube 1.

An internally extending tube piece 2 is inserted from beneath into this tube 1, which tube piece 2 for instance by means of a screw/wedge assembly is anchored to a base plate 7 which can be secured to a base which is not shown for instance by means of three bolts.

This base can be a buried or cast anchor, a floor or a footing which constitutes the support. The interior tube 2 may form the foundation on its own merely by being buried or cast.

The internally extending tube piece 2 is, as shown in FIGS. 2 and 3, configured as a tube being profiled in its cross section and in the shown example comprising three recesses forming grooves 4 which are formed so that the width of the groove is largest towards the inside since the side faces taper inwards towards the outside as shown.

The grooves 4 extend in the longitudinal direction of the tube piece to such an extent, i.e. length, that the necessary adjustability of the outer tube 1 can be obtained. This can be in the entire length of the tube 2 or part thereof.

In these grooves 4 a wedgeshaped expansion body 3 is inserted, as shown in FIGS. 2 and 3.

The body 3 fills the inside of the groove 4 as implied in FIGS. 2 and 3.

The wedge-bodies 3 are further provided with threaded holes 5 for bolts 6 extending through holes 10 in the outer tube 1 as shown in the drawing.

Thus fitted the tubes 1 and 2 can be displaced longitudinally in a telescopic manner.

Once the required position of the tube 1 has been established, the bolts 6 are tightened, whereby the wedge body 3 will be drawn outwards in the groove, causing these to expand transversely.

The internally extending tube piece 2 will thus expand and squeeze against the inside of the outer tube 1 as shown in FIGS. 2a and 3a.

The tubes 1 and 2 are thus locked together in a reliable manner since a uniform pressure distribution will take place among the tubes.

The assembly is easily disengaged, simply by loosening the bolts 6 and releasing the wedge 3, whereby the tube piece 2 will reduce its circumference enabling the tubes to slide in relation to each other.

This simplifies the mounting, and there is no longer any need for a complete levelling of the base.

Besides an easier assembly, the possibility is obtained of subsequent adjustment of the individual tubes 1 on the base, merely by loosening the bolts 6 and tightening them again after the adjustment.

The tubes 1 and 2 are preferably made of steel but can also be made of other metals or perhaps plastic. The same applies to the wedge elements 3.

What is claimed is:

1. An apparatus for adjusting the position of a pair of tubes, an outer tube and an interior tube slidable within the outer tube, and for releaseably locking the tubes together, comprising at least one inwardly projecting groove in a wall of the interior tube, a wedge fitted into the groove and being radially movable within the groove, the wedge engagable with side faces of the groove such that radial movement in a first direction causes the wedge to separate the groove sides to expand the diameter of the interior tube to lock together the interior tube and the outer tube, radial movement in a second direction allowing the groove sides to contract, reducing the diameter of the interior tube for releasing the interior tube from the outer tube to allow sliding movement therebetween.

2. The apparatus according to claim 1, wherein the wedge (3) has sloping sides having a larger width on an innermost side, the groove (4) having a complimentary sloping side shape so that when the wedge (3) is moved in the first direction the interior tube (2) will expand and will lock against the outer tube (1).

3. The apparatus according to claim 1, wherein one or more grooves (4) are provided in the interior tube.

4. The apparatus according to claim 1, wherein the wedge (3) has one or more threaded holes (5), bolts (6) extending through holes in the outer tube (1) and being engaged with one or more threaded holes.

5. The apparatus according to claim 1, wherein the interior tube (2) has an end secured to a foot (7), the foot secured to a base.

\* \* \* \* \*